United States Patent [19]

Satou et al.

[11] Patent Number: 4,905,043
[45] Date of Patent: Feb. 27, 1990

[54] SHUTTER DRIVING APPARATUS FOR PHOTOGRAPHIC PRINTER

[75] Inventors: Hiroyuki Satou; Hiromitsu Wakui; Junichi Tsuji; Satoru Takemoto, all of Kanagawa, Japan

[73] Assignee: Fuji Photo Film Co., Ltd., Kanagawa, Japan

[21] Appl. No.: 292,071

[22] Filed: Dec. 30, 1988

[30] Foreign Application Priority Data

Jan. 18, 1988 [JP] Japan ................................. 63/8188

[51] Int. Cl.4 ..................... G03B 27/72; G03B 9/08; G03B 9/10
[52] U.S. Cl. .................................. 355/71; 354/234.1; 354/250
[58] Field of Search ................... 355/71, 55, 61, 53, 355/41, 77; 354/234.1, 250, 402

[56] References Cited

U.S. PATENT DOCUMENTS

| | | | |
|---|---|---|---|
| 3,886,567 | 5/1975 | Matsumoto et al. | 354/402 |
| 4,512,657 | 4/1985 | Sakato | 355/71 X |
| 4,696,559 | 9/1987 | Kondo | 354/234.1 X |
| 4,712,910 | 12/1987 | Sakato | 355/53 |
| 4,727,399 | 2/1988 | Matsumoto et al. | 355/41 |
| 4,768,051 | 8/1988 | Sasaki | 354/234.1 X |
| 4,806,990 | 2/1989 | Tahara | 355/77 |
| 4,839,680 | 6/1989 | Amada et al. | 354/234.1 X |

Primary Examiner—Richard A. Wintercorn
Attorney, Agent, or Firm—Sughrue, Mion, Zinn, Macpeak & Seas

[57] ABSTRACT

A shutter driving apparatus for use in a photographic printer to drive a shutter for opening and closing the path of light which is incident on a photographic paper comprises a pulse motor for causing the shutter to pivot so as to open and close the light path, first and second stoppers which are arranged to come into contact with the pivoting shutter to thereby dispose it in a position for opening the light path and a position for closing the light path, respectively, a controller for suspending the operation of the pulse motor when the shutter which is being pivoted in the direction for closing the light path by means of the pulse motor reaches a position which is immediately in front of the light path closing position, and a spring for biasing the shutter toward the light path closing position with torque which is smaller than the starting torque and holding torque of the pulse motor and greater than the detent torque thereof. Accordingly, it is possible to reduce the impact with which the shutter strikes against the first and second stoppers.

9 Claims, 3 Drawing Sheets

SHUTTER DRIVING APPARATUS FOR PHOTOGRAPHIC PRINTER

BACKGROUND OF THE INVENTION

1. Field of the Invention

The present invention relates to a shutter driving apparatus for a photographic printer which is arranged such that the path of a ray of light which is incident on a photographic paper is opened and closed by rotating a shutter.

2. Description of the Related Art

In photographic printers for printing an image on a photographic paper, the path of a ray of light which is incident on a photographic paper is opened and closed by means of a shutter so that the photographic paper is exposed to light for a predetermined period of time to print an image thereon.

A shutter of this type is generally rotated or pivoted so as to open and close the path of a ray of light incident on the photographic paper. To drive the shutter, it is common practice to use an apparatus which employs either a rotary solenoid or a bipolar solenoid.

The shutter driving apparatus that employs a rotary solenoid is arranged such that the shutter is rotated from a position for opening the path of the incident light to a position for closing the same by means of driving force which is derived from the rotary solenoid when excited and the shutter is then returned to the light path opening position by the action of a spiral spring which is provided on the rotary solenoid.

In the shutter driving apparatus that employs a bipolar solenoid, the shutter is rotated from the light path opening position to the light path closing position by means of driving force which is derived from the bipolar solenoid when excited and the shutter is then returned to the light path opening position by reversing the polarity of the electric power supplied to the bipolar solenoid.

In shutter driving apparatuses of the types described above, stoppers are provided in addition to a solenoid such as a rotary solenoid or a bipolar solenoid so that the shutter abuts against each stopper when it is rotated to reach the light path opening or closing position.

Accordingly, every time the shutter abuts against one or the other of the two stoppers, a relatively great impact is generated, and this adversely affects the durability of the mechanism and also causes generation of noise.

SUMMARY OF THE INVENTION

In view of the above-described circumstances, it is a primary object of the present invention to provide a shutter driving apparatus for a photographic printer which is designed so that it is possible to reduce the noise generated when the shutter is actuated.

To this end, the present invention provides a shutter driving apparatus for a photographic printer which is arranged to drive a shutter so as to open and close the path of light which is incident on a photographic paper, comprising: a pulse motor for causing the shutter to pivot in a first direction and a second direction which is reverse to it; a first stopper arranged to come into contact with the shutter when pivoted in the first direction so as to dispose the shutter in a first position where it opens the light path; a second stopper arranged to come into contact with the shutter when pivoted in the second direction so as to dispose the shutter in a second position where it closes the light path; control means for suspending the operation of the pulse motor when the shutter which is being pivoted in the second direction by means of the driving force from the pulse motor reaches a third position which is between the first and second positions and which is closer to the second position; and biasing means for biasing the shutter in the second direction so that the shutter rotates over the entire range, that is, from the first position to the second position, with torque which is smaller than the starting torque and holding torque of the pulse motor and greater than the detent torque of the pulse motor.

By virtue of the above described arrangement of the present invention, when an image is to be printed on a photographic paper, the pulse motor is activated to cause the shutter to rotate (pivot) from the second position to the first position. The shutter is rotated (pivoted) until it abuts against the first stopper. At this time, the shutter is rotated with relatively small torque which is obtained by subtracting the rotational torque produced from the biasing force of the biasing means from the starting torque of the pulse motor. Accordingly, the impact with which the shutter strikes against the first stopper is relatively small and therefore the striking noise is reduced.

When the shutter abuts against the first stopper, it is disposed in the first position for opening the path of the light incident on the photographic paper, thus commencing printing of an image on the photographic paper.

When a predetermined period of time has elapsed after the commencement of the printing, the shutter is rotated (pivoted) from the first position toward the second position by means of the driving force from the pulse motor. When the shutter reaches the third position, the operation of the pulse motor is suspended by the control means. Thereafter, the shutter, which is constantly subjected to the biasing force from the biasing means, is rotated until it abuts against the second stopper. At this time, the shutter is rotated with relatively small torque which is obtained by subtracting the detent torque of the pulse motor from the rotational torque produced from the biasing force of the biasing means and, in addition, the stroke of rotation of the shutter is short. Accordingly, the impact with which the shutter strikes against the second stopper is relatively small and therefore the striking noise is reduced.

When the shutter abuts against the second stopper, it is disposed in the second position for closing the path of the light which is incident on the photographic paper, thus completing the printing of the image on the photographic paper.

BRIEF DESCRIPTION OF THE DRAWINGS

The above and other objects, features and advantages of the present invention will become more apparent from the following description of a preferred embodiment thereof, taken in conjunction with the accompanying drawings, in which like reference numerals denote like elements and, of which.

DESCRIPTION OF THE PREFERRED EMBODIMENT

The present invention will be described hereinunder in detail with reference to the accompanying drawings.

Figure 1:
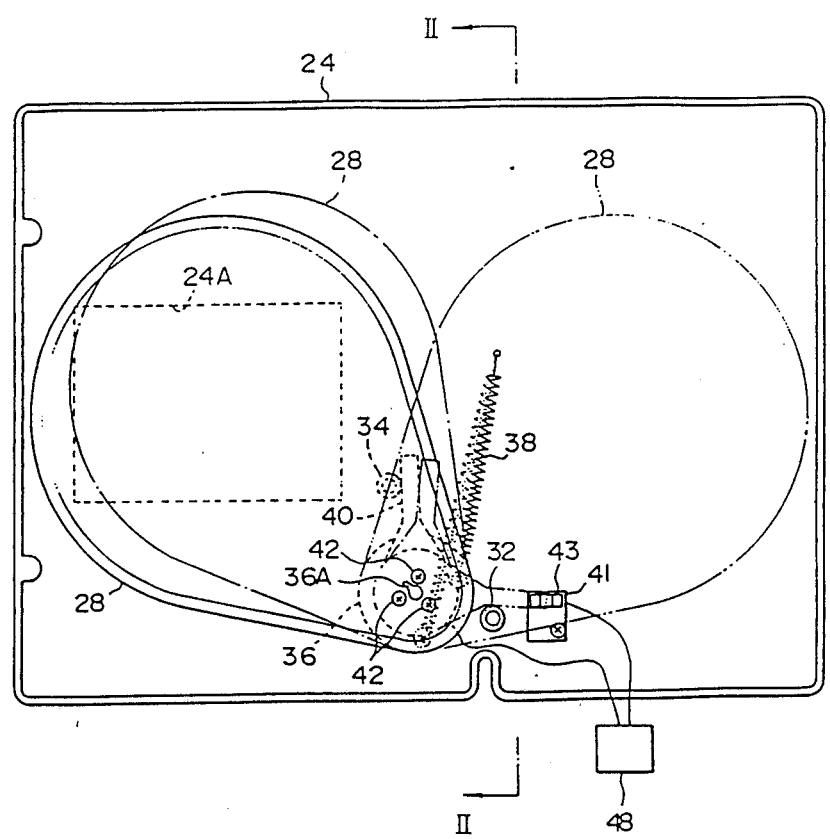
FIG. 1 is a plan view of one embodiment of the shutter driving apparatus according to the present invention which is in its assembled state.
Figure 2:
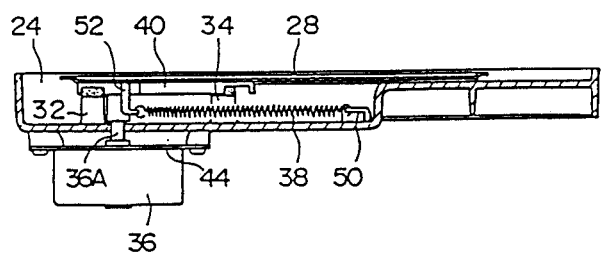
FIG. 2 is a sectional view taken along the line II—II of FIG. 1.
Figure 3:
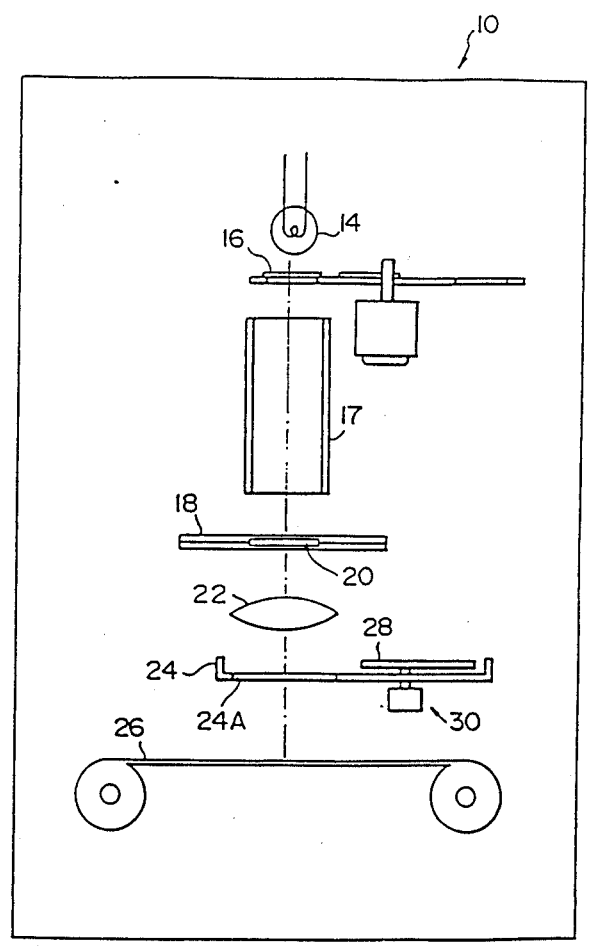
FIG. 3 is a sectional view schematically showing an essential part of a photographic printer in which the shutter driving apparatus shown in FIG. 1 is installed.

FIGS. 1 to 3 show in combination one embodiment of the shutter driving apparatus for a photographic printer according to the present invention. In this embodiment, the present invention is applied to a photographic printer of the type shown in FIG. 3.

Referring to FIG. 3, the photographic printer 10 is arranged such that light which is emitted from a light source 14 is applied to a negative film 20 disposed on a carrier 18 through a filter 16 and a diffusion box 17 to expose a photographic paper 26 through a lens unit 22 and a window 24A provided in a mask 24, thereby printing an image of the film 20 on the photographic paper 26.

In the photographic printer 10, a shutter 28 is disposed between the lens unit 22 and the mask 24 and this shutter 28 is rotated or pivoted by the operation of a shutter driving apparatus 30 according to one embodiment of the present invention to open and close the window 24A in the mask 24 which constitutes a part of the path of the light incident on the photographic paper 26.

The shutter driving apparatus 30 is, as shown in FIGS. 1 and 2 in detail, comprised of stopper pins 32, 34 which serve as first and second stoppers, respectively, a pulse motor 36, and a tension coil spring 38 which serves as biasing means. The stopper pins 32 and 34 are provided on the mask 24 such that, when the shutter 28 is rotated or pivoted in one direction, it abuts against one of the two stopper pins, whereas, when the shutter 28 is rotated or pivoted in the other direction, it abuts against the other stopper pin. More specifically, a plate 40 is rigidly secured to that side of the shutter 28 which is closer to the mask 24 by means of screws 42, and the stopper pins 32 and 34 are provided on the mask 24 at the respective positions which are on the locus of rotation of the plate 40 so that, when the shutter 28 is rotated or pivoted, the plate 40 abuts against either one of the stopper pins 32 and 34. The stopper pin 32 is arranged to dispose the shutter 28 in a position for opening the window or opening 24A which is defined as a first position i.e., the position shown by the two-dot chain line in FIG. 1 when the plate 40 abuts against it. The stopper pin 34 is arranged to dispose the shutter 28 in a position for closing the window 24A which is defined as a second position i.e., the position shown by the solid line in FIG. 1 when the plate 40 abuts against it.

A sensor 43 is secured to the mask 24 through a bracket 41 at a position which is in the vicinity of one of the stopper pins 32 and 34, i.e., the pin 32. The sensor 43 is arranged to detect the fact that the plate 40 has reached the position where it abuts against the stopper pin 32, that is, the fact that the shutter 28 has reached the position for opening the window 24A i.e., the position shown by the two-dot chain line in FIG. 1.

The pulse motor 36 is secured to that side of the mask 24 which is closer to the photographic paper 26 through a bracket 44 shown in FIG. 2. The driving shaft 36A for the pulse motor 36 extends through the mask 24 so that the shutter 28 is engaged with the distal end of the shaft 36A, thus enabling the shutter 28 to rotate in both the directions for opening and closing the window 24A.

The pulse motor 36 is connected to a controller 48 shown in FIG. 1 so that the operation of the pulse motor 36 is controlled by the controller 48. The controller 48 is connected to the sensor 43 so that, when the shutter 28 is rotated in the direction for opening the window 24A (clockwise as viewed in FIG. 1) by means of the driving force from the pulse motor 36 to reach the position for opening the window 24A i.e., the position shown by the two-dot chain line in FIG. 1, the controller 48 effects control on the basis of a signal output from the sensor 43 such that the direction of rotation of the pulse motor 36 is reversed when a predetermined period of time has elapsed after the shutter 28 reached the window opening position, thus causing the shutter 28 to rotate in the direction for closing the window 24A (counterclockwise as viewed in FIG. 1). The controller 48 is also arranged to suspend the operation of the pulse motor 36, that is, to shut off the supply of electric power to the motor 36, when the shutter 28 which is being rotated in the direction for closing the window 24A (counterclockwise as viewed in FIG. 1) by the driving force from the pulse motor 36 reaches a position immediately in front of the window closing position, said position being defined as a third position, that is, a position shown by the one-dot chain line in FIG. 1 which is immediately in front of the position where the plate 40 abuts against the stopper pin 34.

The tension coil spring 38 is disposed between the mask 24 and the shutter 28. More specifically, a bracket 50 shown in FIG. 2 is rigidly secured to the mask 24, while a hook 52 shown in FIG. 2 is rigidly secured to the shutter 28, and the tension coil spring 38 is stretched between the mask 24 and the shutter 28 with both its ends retained by the bracket 50 and the hook 52, respectively.

The tension coil spring 38 biases the shutter 28 in the direction for closing the window 24A (counterclockwise as viewed in FIG. 1) so that the shutter 28 rotates over the entire range, that is, from the window opening position to the window closing position. The level of the biasing force of the tension coil spring 38 is set so that it is possible to rotate the shutter 28 with torque which is smaller than the starting torque and holding torque of the pulse motor 36 and greater than the detent torque thereof.

More specifically, when moved from the window closing position i.e., the position shown by the solid line in FIG. 1 to the window opening position i.e., the position shown by the two-dot chain line, the shutter 28 is rotated with torque which is obtained by subtracting the rotational torque produced from the biasing force of the tension coil spring 38 from the starting torque of the pulse motor 36; when moved from the window opening position to the third position shown by the one-dot chain line in FIG. 1, that is, the position which is immediately in front of the position where the plate 40 abuts against the stopper pin 34, the shutter 28 is rotated with the starting torque of the pulse motor 36. After the shutter 28 has reached the third position and therefore the operation of the pulse motor 36 has been suspended, that is, the supply of the electric power to it has been shut off, the shutter 28 is rotated to the window closing position shown by the solid line in FIG. 1 with torque which is obtained by subtracting the detent torque of the pulse motor 36 from the rotational torque produced from the biasing force of the tension coil spring 38.

The operation of this embodiment will next be explained.

In a stage of preparations for printing an image on the photographic paper 26, the pulse motor 36 is in an inoperative state, and the shutter 28 is in the position for closing the window 24A. More specifically, when the pulse motor 36 is in an inoperative state, the shutter 28 is kept in the position where the plate 40 abuts against the stopper pin 34, that is, the window closing position i.e., the position shown by the solid line in FIG. 1, by means of the rotational torque which is obtained by subtracting the detent torque of the pulse motor 36 from the rotational torque produced from the biasing force of the tension coil spring 38.

When an image is to be printed on the photographic paper 26, the pulse motor 36 is activated. In consequence, the shutter 28 is rotated in the direction for opening the window 24A (clockwise as viewed in FIG. 1) by means of the driving force from the pulse motor 36. The shutter 28 is rotated until the plate 40 abuts against the stopper pin 32. At this time, the shutter 28 is rotated with relatively small torque which is obtained by subtracting the rotational torque produced from the biasing force of the tension coil spring 38 from the starting torque of the pulse motor 36. Accordingly, the impact with which the plate 40 strikes against the stopper pin 32 is relatively small and therefore the striking noise is reduced.

When the plate 40 abuts against the stopper pin 32, the shutter 28 is disposed in the window opening position (the position shown by the two-dot chain line in FIG. 1), so that the window 24A is opened. Thus, the path of the light which is emitted from the light source 14 so as to be incident on the photographic paper 26 is opened to commence printing of an image on the photographic paper 26.

When a predetermined period of time has elapsed after the commencement of the printing, the pulse motor 36 is activated in the direction reverse to the above in response to a control signal output from the controller 48, thus causing the shutter 28 to rotate in the direction for closing the window 24A (counterclockwise as viewed in FIG. 1). At this time, the shutter 28 is rotated with the starting torque of the pulse motor 36. The operation of the pulse motor 36 is suspended when the shutter 28 reaches the position i.e., the position shown by the one-dot chain line in FIG. 1 which is immediately in front of the window closing position and the supply of the electric power to the pulse motor 36 is shut off. Thereafter, the shutter 28, which is constantly subjected to the biasing force from the tension coil spring 38, is rotated until the plate 40 abuts against the stopper pin 34. At this time, the shutter 28 is rotated with relatively small torque which is obtained by subtracting the detent torque of the pulse motor 36 from the rotational torque produced from the biasing force of the tension coil spring 38 and, in addition, the stroke of rotation is short. Accordingly, the impact with which the plate 40 strikes against the stopper pin 34 is relatively small and therefore the striking noise is reduced.

When the plate 40 abuts against the stopper pin 34, the window 24A in the mask 24 is closed with the shutter 28, so that the path of the light which is emitted from the light source 14 so as to be incident on the photographic paper 26 is closed to complete the printing of an image on the photographic paper 26.

Thus, in this embodiment, the impact with which the plate 40 strikes against the stopper pin 32 or 34 when the shutter 28 is actuated is relatively small and therefore the noise is reduced.

As has been described above, the present invention provides a shutter driving apparatus for a photographic printer which is arranged to drive a shutter so as to open and close the path of light which is incident on a photographic paper, comprising: a pulse motor for causing the shutter to pivot in a first direction and a second direction which is reverse to it; a first stopper arranged to come into contact with the shutter when pivoted in the first direction so as to dispose the shutter in a first position where it opens the light path; a second stopper arranged to come into contact with the shutter when pivoted in the second direction so as to dispose the shutter in a second position where it closes the light path; control means for suspending the operation of the pulse motor when the shutter which is being pivoted in the second direction by means of the driving force from the pulse motor reaches a third position which is between the first and second positions and which is closer to the second position; and biasing means for biasing the shutter in the second direction so that the shutter rotates over the entire range, that is, from the first position to the second position, with torque which is smaller than the starting torque and holding torque of the pulse motor and greater than the detent torque of the pulse motor. Accordingly, the impact which is generated when the shutter is acturated is relatively small, so that the durability of the mechanism is improved and it is possible to reduce the noise generated when the shutter is actuated.

Although the present invention has been described through specific terms, it should be noted that the described embodiment is not necessarily exclusive and various changes and modifications may be imparted thereto without departing from the scope of the invention which is limited solely by the appended claims.

What is claimed is:

1. A shutter driving apparatus for a photographic printer arranged to drive a shutter so as to open and close the path of light which is incident on a photographic paper, comprising:

a pulse motor for causing said shutter to pivot in a first direction and a second direction which is reverse to it;

a first stopper arranged said to come into contact with said shutter when pivoted in the first direction so as to dispose said shutter in a first position where it opens said light path;

a second stopper arranged to come into contact with said shutter when pivoted in the second direction so as to dispose said shutter in a second position where it closes said light path;

control means for suspending to operation of said pulse motor when said shutter which is being pivoted in the second direction by means of the driving force from said pulse motor reaches a third position which is between the first and second positions and which is closer to the second position; and biasing means for biasing said shutter in the second direction so that said shutter rotates over the entire range, that is, from the first position to the second position, with torque which is smaller than the starting torque and holding torque of said pulse motor and greater than the detent torque of said pulse motor.

2. A shutter driving apparatus for a photographic printer according to claim 1, further comprising a sensor which outputs a detection signal to said control means on detecting the fact that said shutter has reached the first position.

3. A shutter driving apparatus for a photographic printer according to claim 2, wherein said control means controls said pulse motor such that said shutter is pivoted in the second direction when a predetermined period of time has elapsed after reception of said detection signal.

4. A shutter driving apparatus for a photographic printer according to claim 3, wherein said shutter has a plate member which is arranged to abut against said first and second stoppers so that said shutter is stopped at the first and second positions, respectively.

5. A shutter driving apparatus for a photographic printer according to claim 4, wherein said biasing means is defined by a tension coil spring.

6. A shutter driving apparatus for a photographic printer supported on a mask member having an opening for passage of a ray of light which is incident on a photographic paper to drive a shutter for opening and closing said opening, comprising:
 a pulse motor supported on said mask member and having a driving shaft thereof secured to said shutter to pivot said shutter in a first direction and a second direction which is reverse to it;
 a first stopper arranged to come into contact with said shutter to thereby stop the pivotal movement thereof in the first direction and dispose said shutter in a first position where it opens said opening;
 a second stopper arranged to come into contact with said shutter to thereby stop the pivotal movement thereof in the second direction and dispose said shutter in a second position where it closes said opening;
 controller for suspending the pivotal movement of said shutter caused by the operation of said pulse motor when said shutter which is being pivoted in the second direction by means of the driving force from said pulse motor reaches a third position which is between the first and second positions and which is closer to the second position by a predetermined distance; and
 a spring for biasing said shutter in the second direction so that said shutter rotates over the entire range, that is, from the first position to the second position, with torque which is smaller than the starting torque and holding torque of said pulse motor and greater than the detent torque of said pulse motor.

7. A shutter driving apparatus for a photographic printer according to claim 6, further comprising a sensor which outputs a detection signal to said controller on detecting the fact that said shutter has reached the first position.

8. A shutter driving apparatus for a photographic printer according to claim 7, wherein said controller controls said pulse motor such that said shutter is pivoted in the second direction when a predetermined period of time has elapsed after reception of said detection signal.

9. A shutter driving apparatus for a photographic printer according to claim 8, wherein said shutter has a plate member which is arranged to abut against said first and second stoppers so that said shutter is stopped at the first and second positions, respectively.

* * * * *